United States Patent [19]

Willocx et al.

[11] Patent Number: 5,101,336
[45] Date of Patent: Mar. 31, 1992

[54] SWITCHING CONVERTER

[75] Inventors: Eddie L. M. Willocx, Willebroek; Elve D. J. Moons, Lummen, both of Belgium

[73] Assignee: Alcatel N.V., Amsterdam, Netherlands

[21] Appl. No.: 668,262

[22] Filed: Mar. 11, 1991

[30] Foreign Application Priority Data

Mar. 12, 1990 [EP] European Pat. Off. ........ 90200575.0

[51] Int. Cl.⁵ ............................................. H02M 1/14
[52] U.S. Cl. ........................................ 363/41; 363/21; 363/97; 363/131
[58] Field of Search ............... 323/282, 283, 284, 285, 323/351; 363/21, 41, 97, 131

[56] References Cited

U.S. PATENT DOCUMENTS

| | | | |
|---|---|---|---|
| 3,733,519 | 5/1973 | Griffey | 317/31 |
| 4,210,947 | 7/1980 | Koizumi | 363/21 |
| 4,326,245 | 4/1982 | Saleh | 363/21 |
| 4,330,816 | 5/1982 | Imazeki et al. | 363/21 |
| 4,578,630 | 3/1986 | Grosch | 323/351 |
| 4,683,528 | 7/1987 | Snow et al. | 363/21 |
| 4,764,856 | 8/1988 | Rausch | 363/97 |
| 4,825,347 | 4/1989 | Guerrera et al. | 363/41 |
| 4,866,588 | 9/1989 | Rene | 363/97 |
| 4,943,902 | 7/1990 | Severinsky | 323/285 |
| 4,988,942 | 1/1991 | Ekstrand | 323/282 |
| 5,001,413 | 3/1991 | Ohms | 323/285 |
| 5,021,937 | 6/1991 | Cohen | 363/97 |

FOREIGN PATENT DOCUMENTS 58-101558  6/1983  Japan .

OTHER PUBLICATIONS

E. Hnatek, "Design of Solid-State Power Supplies", Van Nostrand Reinhold Co., Converter & Inverter Design Consid., Bell Tel., Antwerpen, BE., pp. 562-581, 12/81.

Primary Examiner—Jeffret Sterrett
Attorney, Agent, or Firm—Christie, Parker & Hale

[57] ABSTRACT

The switching converter (SPC) mainly includes a duty cycle controller (DCC) whose output controls a switch (T1) for transferring energy from an input (VIN) to an output (VOUT). The duty cycle controller (DCC) includes a sawtooth generator (ST) and a pulse generator (NL) whose output signals (STO, NLO) are OR-ed and then compared with an error voltage (VE), derived from the difference between the output voltage (VOUT) and a reference voltage (VREF1), so as to produce an output signal of which the duty cycle varies linearly from a predetermined non-zero value onwards, thus ensuring that during each cycle the switch (T1) is activated for at least a minimum duration.

5 Claims, 3 Drawing Sheets

SWITCHING CONVERTER

TECHNICAL FIELD

The present invention relates to a switching converter including a switch for allowing transfer of electric energy from an input to an output, an error amplifier for deriving an error signal from the difference between the signal at said output and a reference signal, and a duty cycle controller wherein the ON/OFF periods of a clock signal are modified as a function of said error signal and control said switch.

CLAIM FOR PRIORITY

This application is based on and claims priority from applications first filed in Europe under Application No. 90 200 575.0 dated Mar. 12, 1990. To the extent such prior application may contain any additional information that might be of any assistance in the use and understanding of the invention claimed herein, it is hereby incorporated by reference.

BACKGROUND ART

Such a switching converter is already known in the art, e.g. from the book "Design of Solid-State Power Supplies" by Eugene R. Hnatek, published in 1981 by Van Nostrand-Reinhold, and more particularly on pages 562 to 581 thereof.

In a switching converter of this known type a very small error signal could lead to zero ON periods of the clock signal. As a consequence, the output signal of the duty cycle controller then presents a relatively large low frequency ripple producing considerable low frequency noise. The latter has an unwanted effect in systems operating in the low frequency band such as the voice frequency band in telephone systems.

DISCLOSURE OF INVENTION

An object of the invention is to provide a switching converter of the above type, but having an improved performance with respect to low frequency noise.

According to the invention, this object is achieved due to the fact that said duty cycle controller includes a pulse generator by which said switch is switched ON during at least a predetermined fraction greater than zero of each of said clock signal periods.

In this way, even when the above error signal is very small the switch is periodically ON so that the output signal presents no low frequency ripple.

Another characteristic feature of the present switching converter is that said duty cycle controller further includes a sawtooth signal generator which produces during each of said clock periods a sawtooth signal reaching a predetermined peak amplitude smaller than that of the pulse signal produced by said pulse generator at the start of each of said ON periods, a gating circuit for OR-ing said sawtooth signal with said pulse signal and a comparator circuit for comparing the output signal of said gating circuit with said error signal and producing a digital output signal for controlling the operation of said switch.

In this way the duty cycle of the digital output signal generated by the duty cycle controller varies in function of the error signal from said predetermined fraction onwards.

Another characteristic of the present switching converter is that it further includes a driver circuit, the input of which is coupled to the output of said duty cycle controller and the output of which controls said switch, said switch being a transistor forming part of an input circuit having said input and being coupled in series with a resistor across which a voltage proportional to the current through said transistor is sensed, said driver circuit including between its input and output a series connection of a capacitor and an amplifier, a third comparator comparing said voltage sensed across said resistor with a reference voltage, the output of said third comparator controlling the gate of another transistor whose drain-to-source path short-circuits the input of said amplifier when said sense voltage exceeds said reference voltage.

In this way the present switching converter and its load are protected against damage due to overcurrents or overvoltages.

BRIEF DESCRIPTION OF DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

The switching converter SPC described below is used to supply a DC voltage to analog telephone circuits of a digital telecommunication exchange. This converter includes all the elements of a typical flyback converter, e.g. such as the one described in pages 562 to 581 of the above mentioned book.

Figure 1:
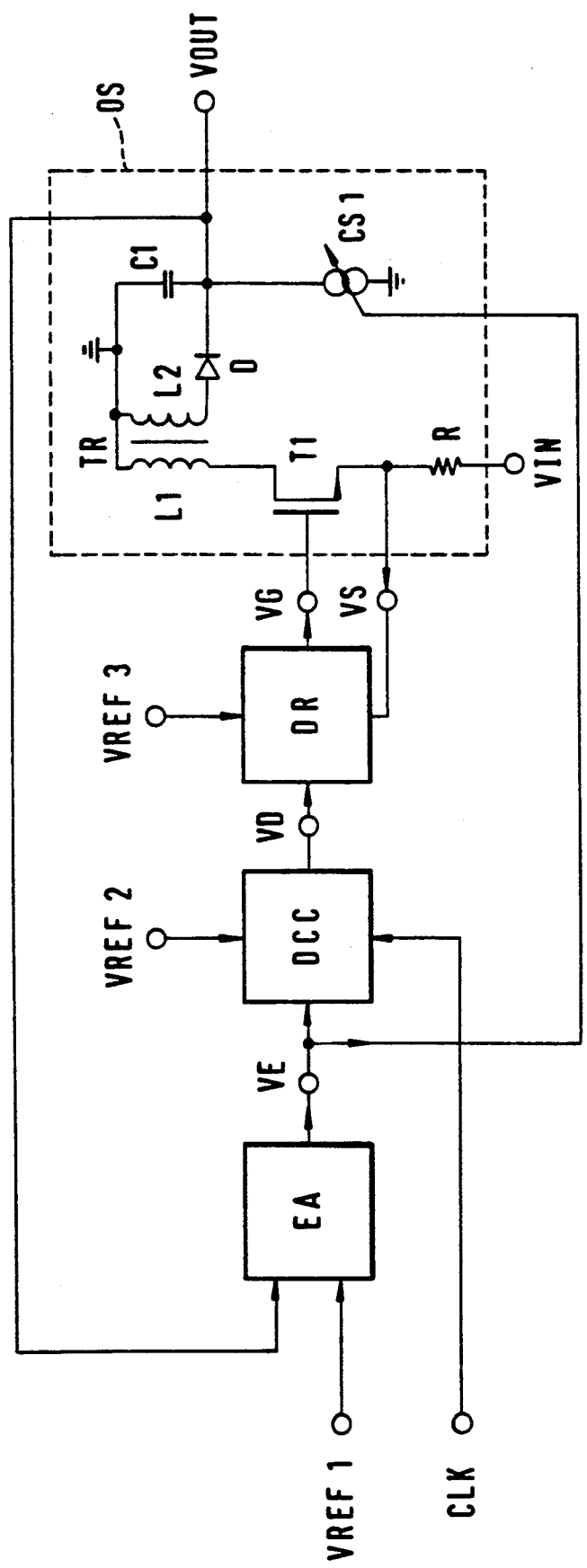
FIG. 1 is a schematic diagram of a switching power converter SPC according to the invention.

The switching converter SPC shcematically shown in FIG. 1 is able to convert an input DC voltage VIN to an output DC voltage VOUT, both these voltages being provided between respective like-named terminals and ground. The input voltage VIN is supplied by an energy source (not shown) which is for instance a battery, whilst the output voltage VOUT is used to feed a load (not shown) which is for instance a telephone line circuit.

The switching converter SPC is mainly constituted by the series connection of an error amplifier EA, a duty cycle controller DCC, a driver circuit DR and an output stage OS.

The error amplifier EA has a feedback signal input VOUT and a voltage reference input VREF1 as well as an error output VE on which a like-named error signal is generated.

The duty cycle controller DCC has an error input VE to which the like named error output of EA is connected, a voltage reference input VREF2, a clock input CLK to which a clock signal CLK having a 50 percent duty cycle is applied and a signal output VD.

The signal output VD is connected to a like named signal input of a driver circuit DR which also has a voltage reference input VREF3, a sensing input VS and a signal output VG. These inputs and output all carry like-named signals.

The output stage OS has input terminals VG, VE and VIN and output terminals VS and VOUT respectively connected to the above mentioned like-named terminals of the switching converter SPC. The output stage OS includes between ground and VIN the series connection of a primary winding L1 of an inductor TR, the drain-to-source path of an N-MOS transistor T1 and a series sense resistor R. Signal output VG of the driver circuit DR is connected to the gate electrode of this transistor T1, whilst the source electrode thereof is connected to the sense input VS of this driver circuit DR. The inductor TR has a secondary winding L2 which is connected in series with a diode D between ground and terminal VOUT. In parallel with the circuit L2, D, i.e. between ground and VOUT, are connected a capacitor C1 as well as a regulated current source CS1. The error output VE of EA is connected to the control input of this current source CS1.

The principle of operation of the above switching converter is as follows.

Error amplifier EA amplifies and filters the deviation of the output voltage VOUT from the voltage reference VREF1. This gives rise to an error signal VE varying between VE1 and VE2 (FIG. 3). The duty cycle controller DCC controlled by the 50 percent duty cycle clock signal CLK modulates this duty cycle in function of the error signal VE between a minimum duty cycle (minimum error VE) and a maximum duty cycle (maximum error), resulting in a binary output signal VD. This duty cycle controller DCC includes a pulse generator NL (FIG. 2) which ensures that the minimum duty cycle is always equal to or greater than a predetermined minimum. DCC will be described in more detail later by making reference to FIGS. 2 and 3.

The driver circuit DR performs a level shift and adaptation of the binary output signal VD of DCC in order to make it suitable for driving switch transistor T1 of the output stage OS. Also, this driver circuit DR receives from the output stage OS a feedback current sense signal VS which is able to cut off driver circuit DR and thereby also its output signal VG in case an excessive current flows through switch transistor T1. DR will be described in more detail later by making reference to FIG. 4.

During the ON periods of T1 a current flows through winding L1 of inductor TR and thereby stores energy therein. During the OFF periods of T1 this energy is discharged from TR via winding L2 in the load (not shown) and in capacitor C1 which discharges in the load during the ON periods of T1. The larger the error between the voltage VOUT and the reference voltage VREF1, the greater the duty cycle of the ON/OFF period of transistor T1 and the more energy is taken from VIN to bring the level of VOUT closer to that of VREF1. In case the error signal VE is very small, i.e. when the duty cycle of the ON/OFF period of T1 is at its minimum, the excess of energy delivered to VOUT is drained off by the regulated current source CS1, controlled by this error signal VE. Due to the fact that in every clock period the minimum duty cycle is greater than zero, as mentioned above no ripple at lower frequencies than the clock frequency appears in the output signal VOUT and thus low frequency noise on VOUT is limited.

Figure 2:
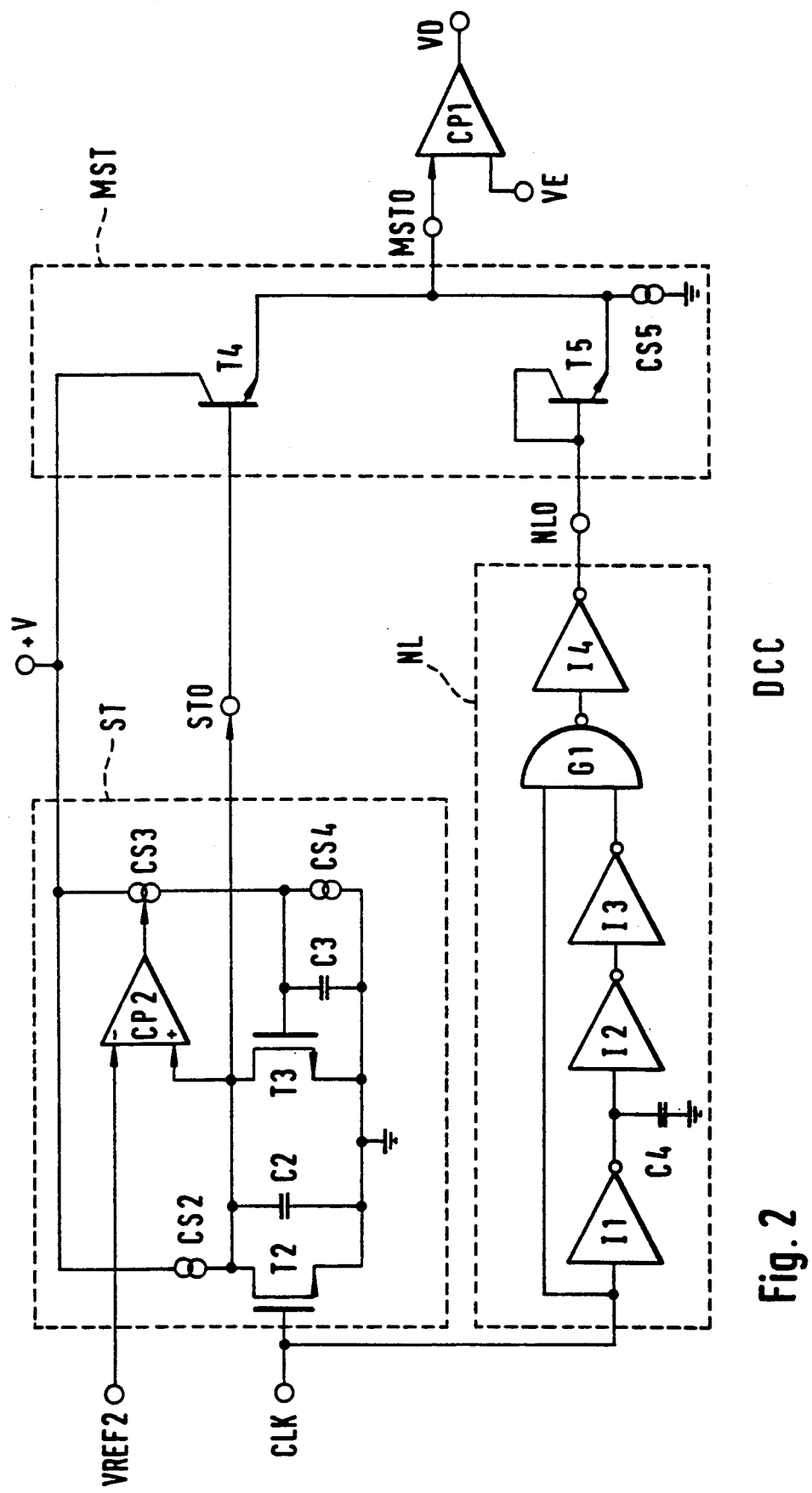
FIG. 2 shows the duty-cycle controller DCC of FIG. 1 in more detail.
Figure 3:
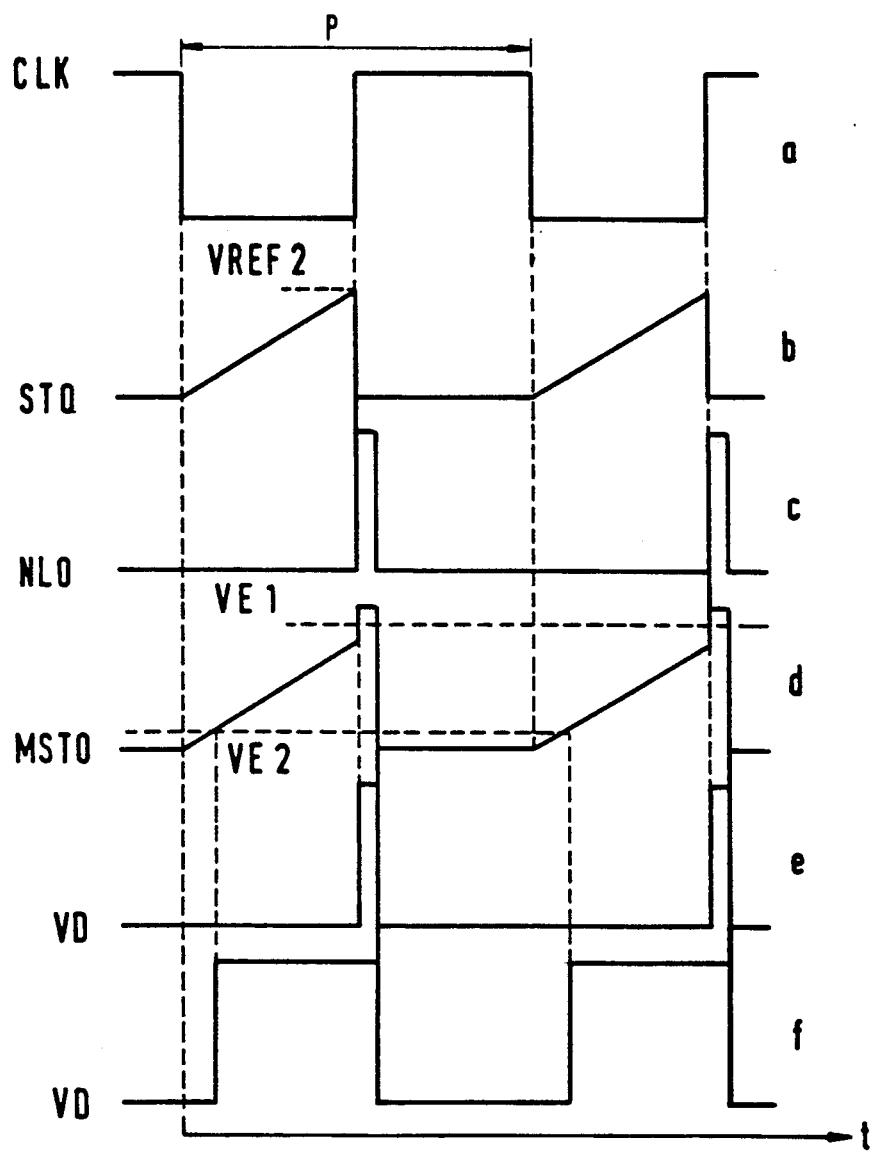
FIG. 3 are time diagrams of signals appearing in the duty-cycle controller DCC of FIG. 2.

Referring to FIGS. 2 and 3, the duty cycle controller DCC is now described in more detail. It comprises a sawtooth generator ST, the pulse generator NL (now limiter), and a circuit MST.

The sawtooth generator ST has a reference input VREF2 and a clock input CLK to which the clock signal CLK with its 50 percent duty cycle and a period P is applied (FIG. 3a). It operates between a supply voltage +V and ground. Between the latter a constant current source CS2 is connected in series with capacitor C2. The clock input CLK is connected to the gate electrode of a transistor T2 whose drain-to-source path is connected in parallel to capacitor C2. C2 is further shunted by a variable impedance constituted by the drain-to-source path of another transistor T3. The gate-to-source path of this transistor T3 is shunted by a capacitor C3 which is connected in series with a controlled constant current source CS3 to the supply voltage V+ and in parallel with a constant current source CS4. The control terminal of CS3 is connected to the output of a comparator CP2 whose negative input (−) is connected to VREF2 and whose positive input (+) is connected to the sawtooth generator output STO which is constituted by the junction point of CS2, T2, C2, T3 and on which a like named sawtooth signal is generated.

During the OFF periods of clock signal CLK capacitor C2 is charged by the current flowing through the constant current source CS2 and generates an output signal with a linear ramp starting at the falling edge of CLK and reaching a peak level at the rising edge of CLK. During the ON periods of CLK transistor T2 short circuits capacitor C2 and thus generates an output signal STO with a level close to zero. The sawtooth signal STO thus obtained is shown in FIG. 3b.

The above three components T2, C2 and CS2 of ST are the basic components for the sawtooth signal generation. The other components of ST are used to automatically regulate the peak level of the sawtooth signal STO such that it is equal to the stable reference voltage VREF2. Indeed, when the amplitude of the output signal STO increases above VREF2 comparator CP2 switches ON the current source CS3 which then charges capacitor C3 relatively slowly with a time constant covering several clock periods. Transistor T3 at a certain moment becomes conductive and then deviates the charge current from CS2 away from capacitor C2 and thus decreases the slope of the signal STO and thereby also the peak level thereof. When conversely the peak level decreases below the reference voltage VREF2, CS3 is switched OFF and the capacitor C3 slowly discharges through the current source CS4. This voltage decrease makes T3 less conductive and thus increases the slope of the output signal STO. The circuit stabilizes at a peak level of the output signal STO equal to VREF2. This output signal STO is therefore independent of the supply voltage and/or the temperature variations as well as of the component tolerances.

In the noise limiter NL the clock signal CLK is applied to an input of a NAND gate G1 via inverters I1, I2 and I3 in cascade and directly to the other input of this NAND gate G1. The output of G1 is connected via an inverter I4 to an output NLO of NL. A capacitor C4 is further connected between the output of inverter I1 and ground so as to cause CLK to be submitted to a fixed delay. It is clear that because of this delay pulses are generated at the output NLO of NL starting at the positive edge of each clock period P of CLK and having a duration equal to this delay (FIG. 3c). The above VREF2 is so chosen that the amplitude of these pulses is larger than that of the peak amplitude of the sawtooth signal.

The output NLO is connected to the base of a diode-connected NPN transistor T5 which forms part of the circuit MST together with an NPN transistor T4 connected as an emitter follower, the base and collector of T4 being connected to the output STO of ST and to +V respectively. The emitters of these transistors are each connected to ground via a constant current source CS5. These commoned emitters constitute the output MSTO of MST. Due to the diode function of TS, the pulse on NLO is analog OR-ed with the sawtooth signal on STO, and this produces a modified sawtooth signal on MSTO, as shown in FIG. 3d.

To be noted that the level of VREF2 and the amplitude of NLO are chosen so that the higher limit VE1 of the error signal VE lies between those two levels and that the lower level of MSTO remains below the lower limit VE2 of this error signal VE.

The above modified sawtooth signal on MSTO is now compared with the error signal VE in comparator CP1 of DCC. As a consequence, CP1 produces on its output VD a periodic digital output signal VD of which the duty cycle varies between a minimum duty cycle corresponding to the error signal level VE1 (FIG. 3e) and a maximum duty cycle corresponding to the error signal level VE2 (FIG. 3f).

Figure 4:
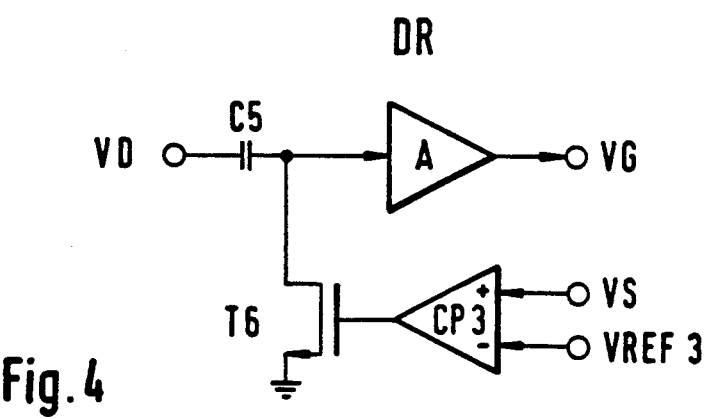
FIG. 4 shows the driver circuit DR of FIG. 1 in more detail.

Reference is now made to FIG. 4 which shows the driver circuit DR in more detail. The input VD of the driver circuit DR is coupled to the output VG thereof via a series connection of a capacitor C5 and an amplifier A. The positive input (+) of a comparator CP3 also included in DR is connected to the above mentioned sense outut VS of the output stage OS, whilst the negative input (−) of this comparator CP3 is connected to a voltage reference input VREF3. The output of this comparator CP3 is connected to the gate of a transistor T6, which is also included in DR and which has its source electrode connected to ground and its drain electrode connected to the input of amplifier A.

The operation of driver DR is as follows. Capacitor C5 passes only the AC component of the signal VD to the amplifier A which is also a level adapter able to transform the signal on VD to a signal on its output VG suitable to drive transistor T1 of the output stage OS. When the voltage on the sense input VS exceeds a reference value applied on input VREF3, transistor T6 becomes conductive and short-circuits the input of amplifier A so that transistor T1 of OS is then cut off. This prevents an excessive current from flowing in transistor T1 in case of start-up or of excessive load of the converter SPC.

While the principles of the invention have been described above in connection with specific apparatus, it is to be clearly understood that this description is made only by way of example and not as a limitation on the scope of the invention.

We claim:

1. Switching converter comprising
   a switch for allowing transfer of electric energy from a converter input to a converter output,
   an error amplifier for deriving an error signal from the difference between the signal at said output and a reference signal, and
   a duty cycle controller wherein the ON/OFF periods of a clock signal are modified as a function of said error signal and control said switch, said duty cycle controller further comprising
   a pulse generator for switching said switch ON during at least a predetermined fraction greater than zero of each of said ON/OFF periods.

2. Switching converter according to claim 1, wherein said duty cycle controller further comprises
   a sawtooth signal generator which produces during each of said clock periods a sawtooth signal reaching a predetermined peak amplitude smaller than that of a pulse signal produced by said pulse generator at the start of each of said ON periods,
   a gating circuit for OR-ing said sawtooth signal with said pulse signal, and
   a comparator circuit for comparing the output signal of said gating circuit with said error signal and producing a digital output signal for controlling the operation of said switch.

3. Switching converter according to claim 2, wherein said sawtooth generator includes
   a capacitor coupled in series with a constant current source for charging said capacitor,
   a transistor controlled by said clock signal and coupled in parallel with said capacitor for discharging it, and
   a variable impedance in parallel with said capacitor for partially deviating the current of said current source as a function of output signal of a second comparator comparing said sawtooth signal and a second reference voltage to which said peak amplitude is made equal.

4. Switching converter according to claim 3, wherein said sawtooth generator further comprises
   a second transistor having a drain-to-source path which functions as said variable impedance,
   a second capacitor coupled in parallel with said drain-to-source path of the second transistor,
   a controlled second constant current source coupled in series with said second capacitor for charging said second capacitor, said second current source being switched ON and OFF by said output signal of said second comparator circuit, and
   a third constant current source coupled in parallel across said second capacitor for discharging said second capacitor.

5. Switching converter according to claim 1, further comprising
   an input circuit further comprising
      a transistor functioning as said switch, and
      a sensing resistor coupled between said transistor and said converter input for producing a voltage proportional to the current through said transistor,
   a driver circuit having an driver input coupled to an output of said duty cycle controller and a driver output for controlling said switch, said driver circuit further comprising
      a capacitor and
      an amplifier coupled in series with said capacitor,
   a third comparator for comparing said voltage across said sensing resistor with a reference voltage, and
   another transistor having a gate which is controlled by an output of said third comparator and a drain-to-source path which short-circuits the input of said amplifier when said voltage exceeds said reference voltage.

* * * * *

UNITED STATES PATENT AND TRADEMARK OFFICE
CERTIFICATE OF CORRECTION

PATENT NO. : 5,101,336
DATED : March 31, 1992
INVENTOR(S) : Eddie L.M. Willocx; Elve D.J. Moons It is certified that error appears in the above-identified patent and that said Letters Patent is hereby corrected as shown below:

Column 2, line 41, change "shcematically" to
-- schematically --.

Column 3, line 67, after "NL" change "now" to -- noise --.

Column 5, line 34, change "outut" to -- input --.

Column 6, line 54, after "having" change "an" to -- a --.

Signed and Sealed this

Eleventh Day of January, 1994

Attest:

BRUCE LEHMAN

Attesting Officer        Commissioner of Patents and Trademarks